United States Patent [19]

Haubenestel

[11] 3,870,347

[45] Mar. 11, 1975

[54] COUPLING SYSTEM RELATING ESPECIALLY TO CONDUIT FITTINGS, ELECTRICAL BOXES OR SPECIAL FITTINGS FOR OTHER APPLICATIONS

[76] Inventor: Kenneth C. Haubenestel, 2633 Grant Ave., Dayton, Ohio 45406

[22] Filed: Mar. 14, 1973

[21] Appl. No.: 341,064

Related U.S. Application Data

[63] Continuation of Ser. No. 139,687, May 3, 1971, abandoned.

[52] U.S. Cl.................................. 285/156, 285/421
[51] Int. Cl............................................. F16l 41/00
[58] Field of Search ........... 285/121, 128, 194, 323, 285/421, 156; 174/65 R; 220/3.7

[56] References Cited
UNITED STATES PATENTS

| 128,063 | 6/1872 | Penfield.......................... 285/194 X |
| 681,090 | 8/1901 | White............................ 285/421 UX |
| 805,968 | 11/1905 | Greenfield........................... 285/128 |
| 1,827,249 | 10/1931 | McCoy.............................. 285/421 |
| 2,937,038 | 5/1960 | Gondek............................. 285/323 |

Primary Examiner—Dave W. Arola
Attorney, Agent, or Firm—Gleim and Tritle

[57] ABSTRACT

A coupling device relating to conduit fittings, electrical boxes and the like includes a housing with an opening for receiving a tubular element such as a pipe or other conduit. An arcuate clamp member is releasably connected by a screw to the housing in cooperative relationship with an arcuate portion of the housing for releasably connecting the tubular element to the housing in desired disposition relative to said opening. The screw is also connected to a wedge-like member that is slidably mounted within the housing. When the screw is tightened, the clamp member is rigidly connected to the housing and simultaneously the wedge-like member moves to exert an additional lateral force pressure on a tubular element positioned in or adjacent said opening.

9 Claims, 7 Drawing Figures

3,870,347

COUPLING SYSTEM RELATING ESPECIALLY TO CONDUIT FITTINGS, ELECTRICAL BOXES OR SPECIAL FITTINGS FOR OTHER APPLICATIONS

This is a continuation of application, Ser. No. 139,687, filed May 3, 1971 abandoned.

This invention relates to a coupling system and especially to conduit fittings, electrical boxes or special fittings such as may be attached to pipes or tubes. It is particularly concerned with the assembly and attachment of pipes or tubes to conduit fittings.

Conduit fittings are of two types, threaded and nonthreaded, and their attachment to pipes or tubes is either by threaded ends or by set screw adjustment. Neither of these methods of attachment provides an inexpensive method of manufacture, and the threaded type is not particularly suited to assembly and disassembly in difficult areas of installation. Set screw adjustment often becomes loose as the result of vibration, thereby allowing tubes to become disconnected.

A principal object of the present invention is to provide an improved fitting for obviating the above-noted problems.

Another object is to provide a means of attachment between a fitting and a tube that will facilitate production of the fitting and will also facilitate assembly of the fitting and the tube.

Another object is to provide means for changing a fitting without requiring complete disassembly of a previously assembled installation.

Such objects are achieved in accordance with the present invention by the provision of a wedge-like member that is slidably mounted within a fitting housing. When the wedge-like member is tightened, its movement performs the dual function of interconnecting other components of the fitting in fixed secured relation with the housing and simultaneously exerts a clamping force transversely of a pipe or tube received in the housing.

Other objects and advantages will become apparent from the following description taken in connection with the accompanying drawings, in which.

Figure 7:
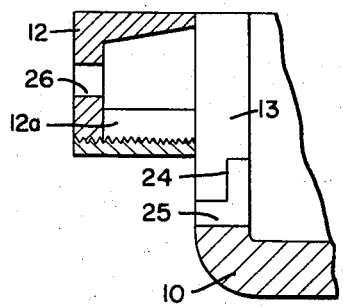
FIG. 7 is an enlarged fragmentary section view of the housing of FIG. 1.

As shown in the drawings, a fitting embodying the present invention comprises a housing member 10 having holes 13 extending through the housing walls for communication with the interior of tubular elements such as pipes and/or conduits which are to be connected to the housing. To facilitate such connection, the housing includes one or more depending members or projections 11, 12 extending outwardly from exterior walls of the housing. As is best shown in FIGS. 1 and 7, projection 12 includes an arcuate surface 12a that is substantially semicircular and is coaxial with an adjacent hole 13.

Figure 1:
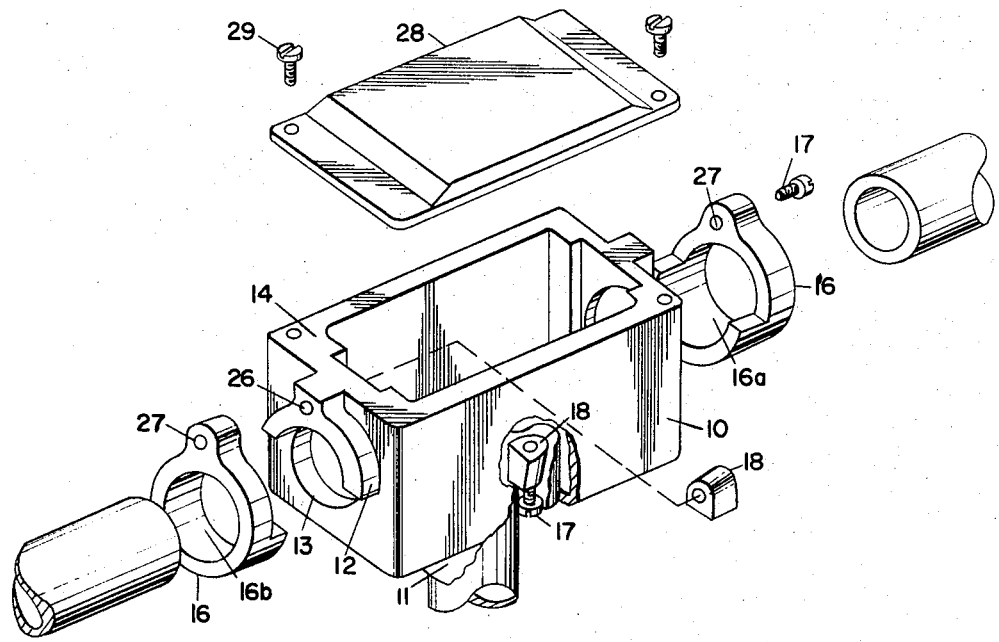
FIG. 1 is an exploded view of the several components of a conduit fitting embodying the present invention.
Figure 2:
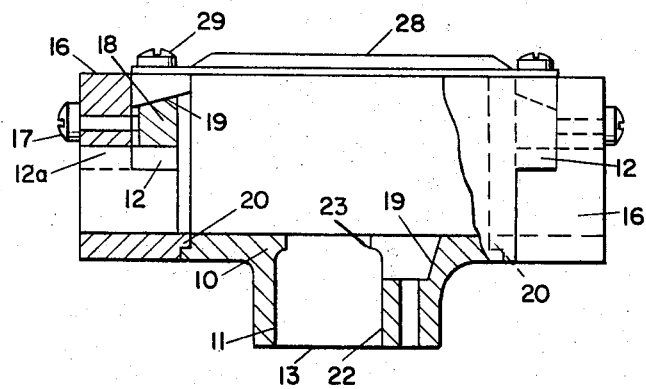
FIG. 2 is a side elevational view, partly in section, of an assembled embodiment of FIG. 1.
Figure 3:
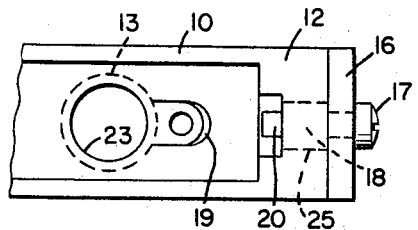
FIG. 3 is a fragmentary top plan view of the housing of FIG. 1.

As shown in FIGS. 1 and 3, clamping members 16 are connected to the housing by fastening means such as screw 17, extending through holes 26, 27 in the housing 10 and the clamp member 16, respectively, and threadedly engaging a nut 18. The nut is received within and is prevented from rotating by a slot 25, best shown in FIG. 2, formed in the walls of housing 10. At least one side of the nut is tapered and engages a surface 19, which may be cast or otherwise formed in the wall of housing 10, and which is inclined relative to the axis of hole 13 to diverge from the exterior toward the interior of the housing as shown in FIG. 2.

Figure 6:
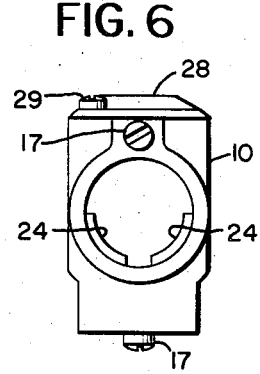
FIG. 6 is an end elevational view of the assembled fitting of FIG. 1.
Figure 5:
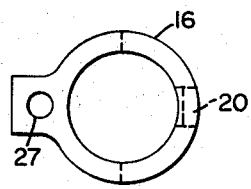
FIG. 5 is an end view of one of the clamp members of FIG. 1.

As best shown in FIGS. 3 and 5, a slot 21 is formed in the wall of housing 10 substantially opposite slot 25. Slot 21 receives a key 20 which extends from clamp member 16, as best shown in FIG. 2, to insure proper registry of arcuate portion 16a and hole 16b with hole 13. As screw 17 and nut 18 are drawn tight, clamp member 16 is tightly secured to the housing in the vicinity of the screw. Additionally, when the end of a tubular element such as a pipe or conduit is disposed in holes 16b and 13, and when the tightening action of the screw causes nut 18 to move toward the exterior of the housing, inclined surface 19 causes the nut to move downwardly and thereby exert a lateral force against such tubular element which in turn exerts a similar force against key 20 in housing slot 21, as shown in FIG. 2. If desired, shoulders 24 are provided in housing 10 projecting partially into hole 13 to provide a top for the end of the tubular element, as shown in FIG. 6.

Similarly, as shown in FIG. 2, the housing includes a bore 22 of greater diameter than that of an adjacent hole 13 to provide a similar stop or shoulder 23 for the end of another tubular element which may be secured to the housing substantially as noted above except that a clamping member is not required because the tubular element is forced against the housing wall adjacent bore 22 by the lateral movement of nut 18 when the screw is tightened. If desired, watertight connections between the housing and such tubular elements can be effected by applying a suitable sealant such as self curing epoxy adhesive to the interengaged regions of the several components.

Figure 4:
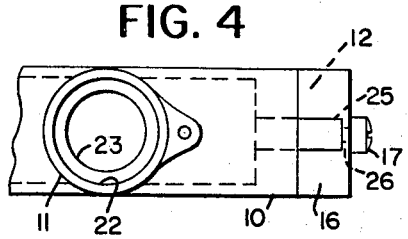
FIG. 4 is a bottom plan view of the housing of FIG. 1.

FIG. 4 shows back coring of the housing 10 to produce slot 25 and inclined surface 19 for receiving the tapered nut 18 and also the remainder of the horizontal holes 13 through the horizontal projections 12. Holes 26 in the projections intersect slots 25 and receive screws 17 and act as a means to keep slamping members 16 from becoming separated from the housing. FIG. 7 shows an enlarged view how the hole is formed by back coring projection 12 and straight coring housing 10. It further shows how the key slot 21 and shoulder 24 are formed by the straight core, and the direction of the cores to produce holes 13. Additionally, such structure and forming methods contemplate the formation of threaded or serrated portions, as shown in FIG. 7, to the under side of projection 12 as well as to corresponding portions of the clamping member if desired. Accordingly, fittings of the rigid and the non-rigid type can be readily produced in accordance with the present invention without necessitating expensive threading operations.

While particular embodiments of the invention have been illustrated and described, it will be obvious that various changes and modifications can be made without departing from the invention, and it is intended in the appended claims to cover all such changes and modifications that fall within the true spirit and scope of the invention.

I claim:

1. Conduit fitting for connection to tubular elements such as pipes and conduits comprising
   a housing having walls defining
   an aperture in at least one wall of the housing and also defining
   a guide way extending along the axis of said aperture and extending axially outwardly from at least one wall and having a surface angularly disposed relative to said axis and diverging therefrom in a direction from the exterior toward the interior of said housing,
   a first arcuate portion terminating with outer ends which lie in a plane generally parallel to the axis of said aperture, said first arcuate portion connected to said guide ring and said one wall and extending axially outwardly from said one wall and coaxial with said aperture,
   a clamp member having a hole therethrough registering with said aperture and having an arcuate end portion terminating with outer ends bearing against the outer ends of said first portion and having a second arcuate portion axially spaced from said end portion coaxial with said hole,
   means releasably connecting said clamp member to said housing against relative movement thereto thereby providing lateral support for said tubular element when said element is disposed in said aperture including
   a nut mounted for reciprocation in said guide way with opposite faces of said nut in engagement with said angularly disposed surface and with said tubular elements respectively, and
   a screw threadedly engaging said nut and extending through said housing and said clamp member.

2. Fitting according to claim 1 wherein said housing includes a tubular portion projecting outwardly from another one of said walls and adapted for receiving an end of a tubular element, said projecting portion having a notch therein for receiving a nut and preventing rotation thereof, said notch having a surface angularly disposed relative to the axis of said tubular portion and diverging from said axis toward the interior of the housing, a nut mounted for reciprocation in said notch, and a screw extending parallel to said axis through said tubular portion and threadedly engaging said nut.

3. Fitting in accordance with claim 1 wherein said first and second arcuate portions are semicircular.

4. Fitting according to claim 1 wherein at least one of said first and second arcuate portions additionally includes a threaded portion formed on the radially inner side of said one arcuate portion.

5. Fitting according to claim 1 wherein said means releasably connecting said clamp member to said housing includes interengaging elements of radially facing abutment means supporting the clamp member on the housing when lateral force is developed on the clamp member as a result of movement of said nut.

6. Fitting according to claim 5 wherein said interengaging elements include a key-receiving slot extending axially of said aperture at a location opposite said nut, and a key depending from said second arcuate portion and disposed in said slot.

7. Fitting according to claim 1 wherein threaded portions are formed on the radially inner sides of both of said arcuate portions.

8. Fitting according to claim 1 wherein said housing includes tubular portion projection outwardly from another one of said walls and adapted for receiving an end of a tubular element, a notch within said projection receiving a nut and preventing rotation thereof, said notch having a surface angularly disposed relative to the axis of said tubular portion and diverging from said axis toward the interior of the housing, a nut mounted for reciprocation in said notch, and a screw extending parallel to said axis through said tubular portion and threadedly engaging said nut.

9. Fitting according to claim 1 and additionally including abutment means depending from said housing walls into said aperture for limiting the extent of entry of a tubular element into said aperture.

* * * * *